June 20, 1950 D. M. WEIGEL 2,512,292
INTERMITTENT GRIP VARIABLE RATIO DRIVE
Filed Jan. 19, 1945 5 Sheets-Sheet 2

INVENTOR.
DANIEL M. WEIGEL
BY *Richey & Watts*
ATTORNEYS

June 20, 1950 D. M. WEIGEL 2,512,292
INTERMITTENT GRIP VARIABLE RATIO DRIVE
Filed Jan. 19, 1945 5 Sheets-Sheet 3

INVENTOR.
DANIEL M. WEIGEL
BY
Richey & Watts.
ATTORNEYS

June 20, 1950 D. M. WEIGEL 2,512,292
INTERMITTENT GRIP VARIABLE RATIO DRIVE
Filed Jan. 19, 1945 5 Sheets-Sheet 4
Fig. 8
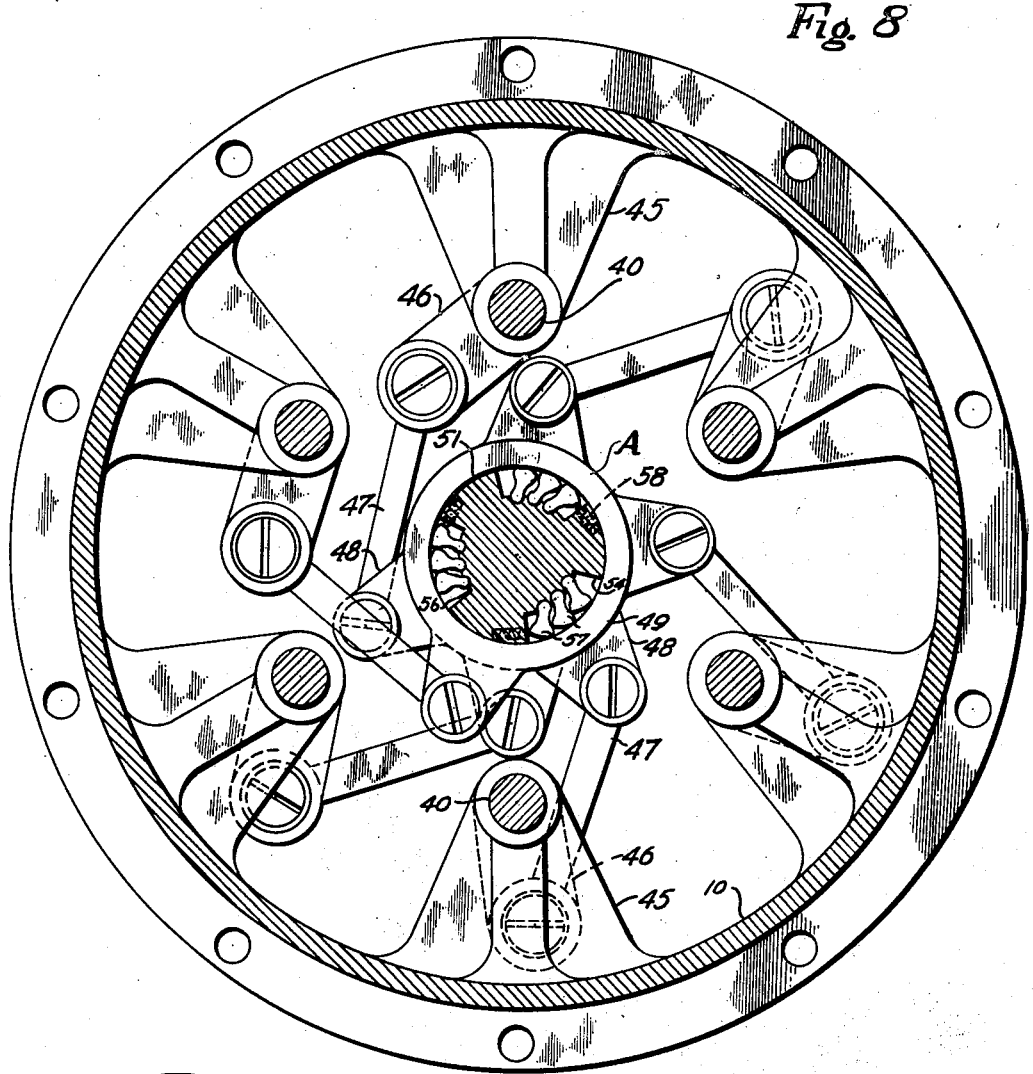
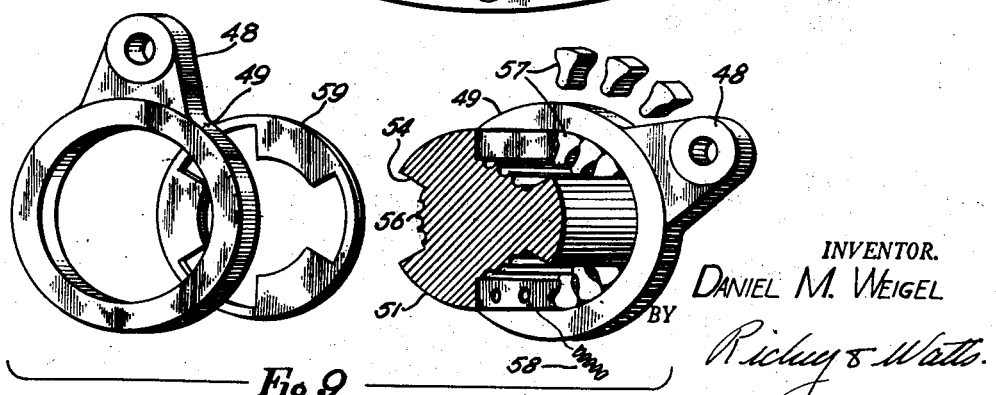
Fig. 9
INVENTOR.
DANIEL M. WEIGEL
BY
Richey & Watts
ATTORNEYS

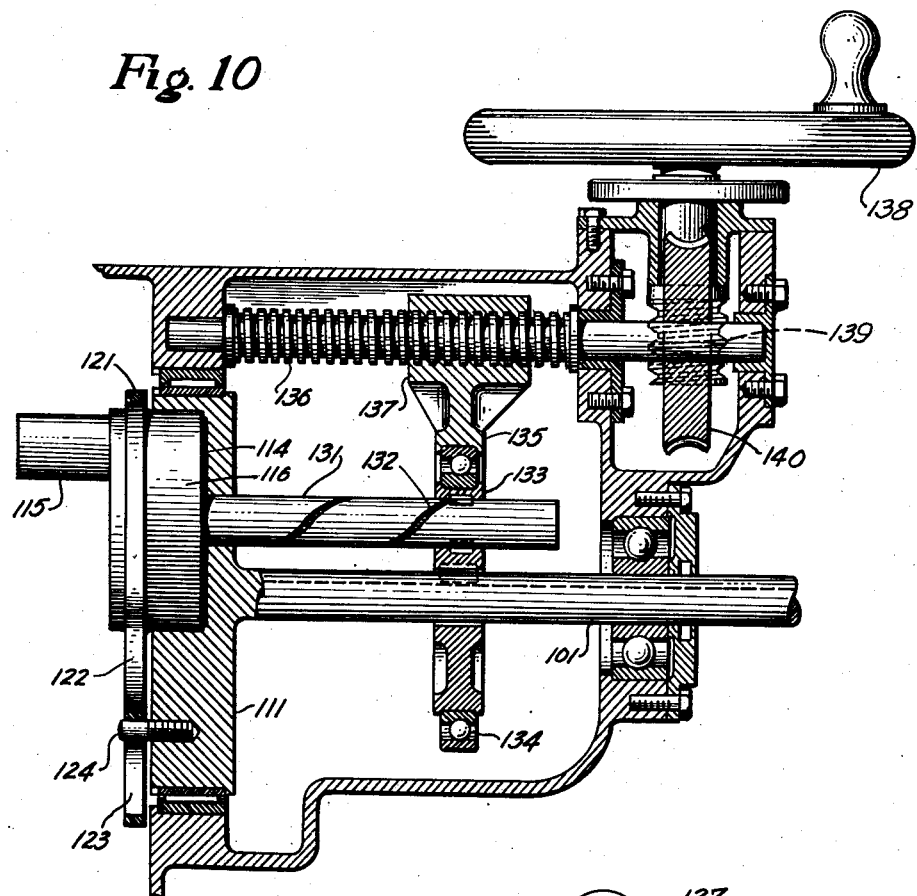
Fig. 10
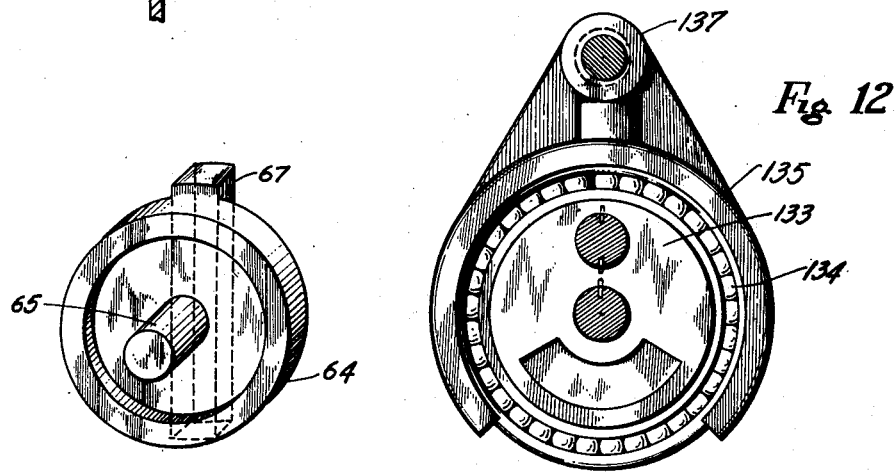
Fig. 11
Fig. 12
INVENTOR.
DANIEL M. WEIGEL
BY
ATTORNEYS Patented June 20, 1950

2,512,292

UNITED STATES PATENT OFFICE 2,512,292

INTERMITTENT GRIP VARIABLE RATIO DRIVE

Daniel M. Weigel, Detroit, Mich.

Application January 19, 1945, Serial No. 573,537

6 Claims. (Cl. 74—114)

This invention relates broadly to change speed gearing and more particularly to improvements in transmissions of the type emobdying a positive driving mechanism operable over a wide range of speed variation.

Of the many forms of change speed gearing that have been developed in the last decade, the variable speed friction drive, has been predominant. The transmission of power in such devices has, as a rule, been effected through cones, discs and other similar elements used in combination with leather, rubber, and fabric belts or facings on one or both of the driving elements. In such devices, however, the frictional coefficient of the materials irrespective the combination thereof limits the transmission to low torque operation. A speed reduction of 16:1 is considered to be the ultimate in friction transmissions, and most manufacturers recommend only 6:1 variation.

One of the objects of this invention is to provide a mechanical transmission having a gradual change speed reduction ratio throughout a range of output speeds from zero to a definite maximum.

Another object is to provide mechanism which will transmit full power at all output speeds.

Another object is to provide a mechanical transmission in which the speed change is automatically adjusted to suit varying load conditions so that the full power of input, minus small frictional losses, is transmitted under all conditions of load except when the load torque imposed upon the output is increased above a definite maximum limit, in which case the output speed becomes zero.

A further object of this invention is realized by the construction of a mechanism adaptable to variable power input and variable load conditions, the speed change mechanism automatically arranging itself to balance the power input and the load.

Another object is to provide a transmission having a manually controlled speed change ratio which may be gradually adjusted throughout a range from zero output speed to a maximum output equal to or greater than the speed of input.

Further objects are realized by the construction of a transmission which has a high efficiency, which is simple of design and operation, and which is readily adaptable to modifications of size, design and control.

Other objects and advantages more or less ancillary to the foregoing and the manner in which all the various objects are realized will appear in the following description, which considered in connection with the accompanying drawings, sets forth the preferred embodiment of the invention.

Referring to the drawings wherein the preferred embodiment of the invention is illustrated:

Fig. 8 is a transverse sectional view on line 8—8 of Fig. 1 showing the mechanism for linkage for the transmission of power between the countershaft cranks and the overrunning clutches;

Fig. 9 illustrates the structure of the clutch parts and their relation to each other in the assembly;

Fig. 10 is a longitudinal section of the modified form of the driving pin and mechanism for adjusting the speed change ratio of the transmission;

Fig. 11 is a view in perspective of the drum of the clutch which prevents the driven shaft from overrunning the input shaft; and Fig. 12 is a front elevational view of the helix nut and yoke assembly of the control mechanism shown in Fig. 10.

Figure 1:
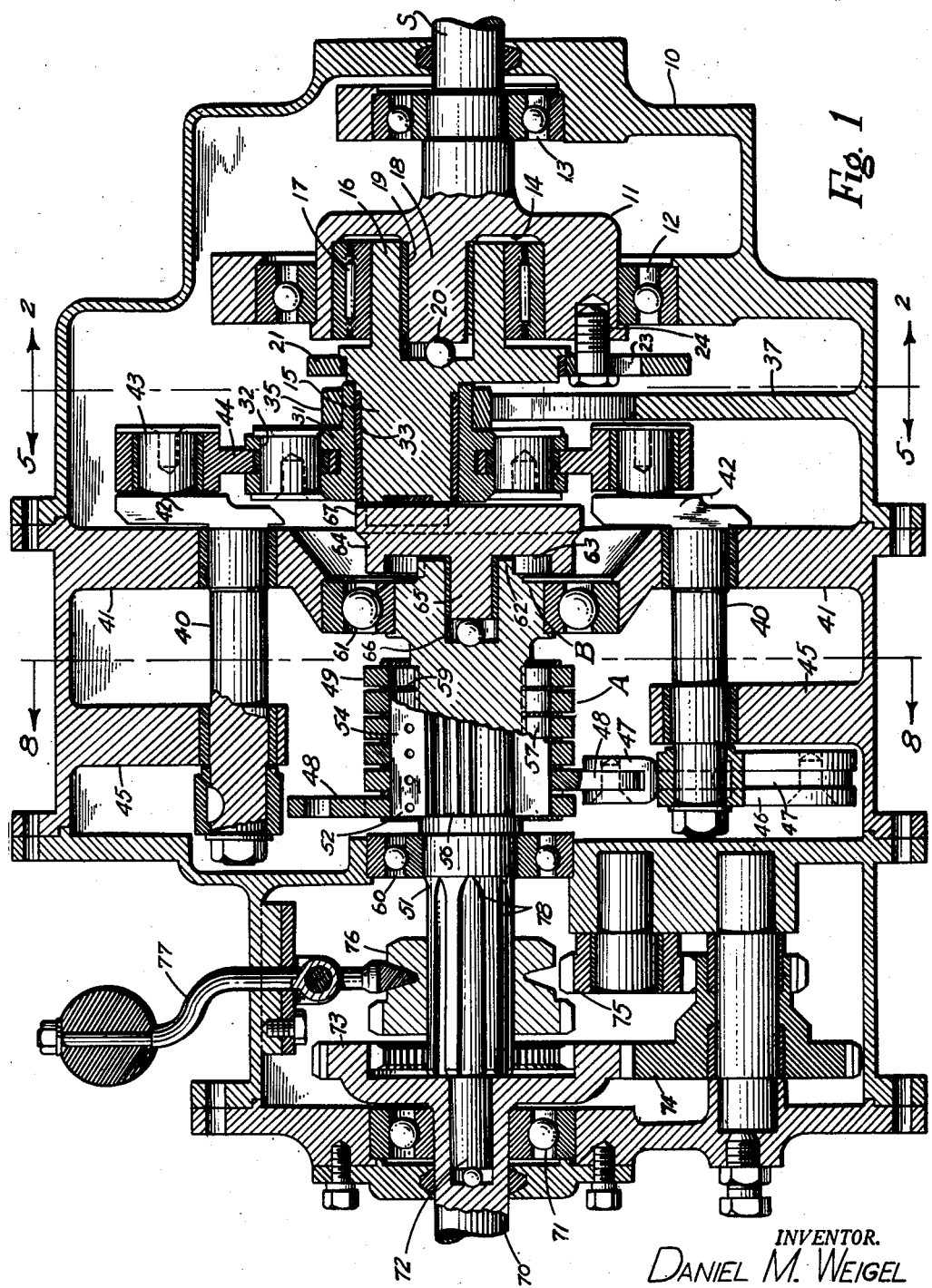
Fig. 1 is a longitudinal sectional view of the transmission.

Referring first to Fig. 1, the transmission comprises a housing 10 suitably formed to support the various bearing embodied in the machine and also to accommodate access to the interior of the housing for purposes of assembly, adjustment and replacement of parts.

Power is supplied to the transmission through a shaft S which terminates within the housing in an enlarged concentric hub 11. The shaft S is supported in anti-friction bearings 12 and 13 mounted in bosses in the housing 10 which are machined with annular shouldered ledges to prevent outward longitudinal motion of the shaft.

The hub 11 is machined with an annular recess 14 in the face thereof which is disposed in eccentric relation with the hub 11 and medial axis of the shaft S, the radial distance between the center of the recess and the center of the shaft being determined in each design by the operative requirements of the machine. A driving pin 15 formed with a hub 16 on the outer face thereof is mounted on anti-friction bearings 17 in the recess 14 of the input shaft S. The central portion of the hub 16 is bored for piloted engagement with a pintle 18 machined in the end of the shaft S concentric with the center of the recess. The pilot bearing is preferably provided with a wear bushing 19 and a thrust bearing 20 disposed to receive the thrust imposed upon the pin during operation of the transmission.

The axis of the driving pin 15 is eccentric to the hub 16, the eccentricity thereof being preferably equal to the distance between the center of the shaft S and the center of the annular recess 14.

Figure 2:
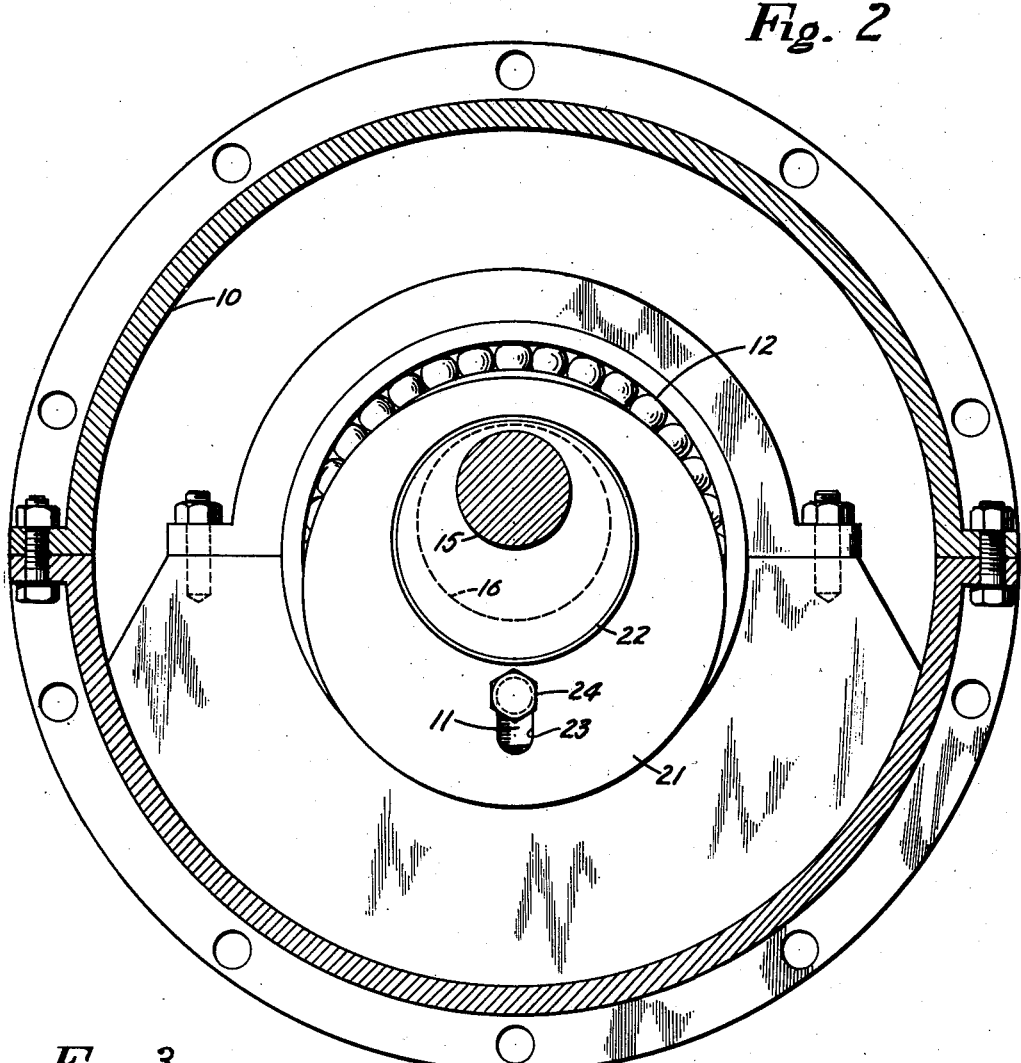
Fig. 2 is a transverse section on line 2—2 of Fig. 1 showing the driving pin in its position of maximum throw.

From the foregoing it will be seen that rotation of the drive pin 15 within the hub 11 will vary the center-to-center distance of the shaft S and pin 15 from zero (Fig. 3) to the maximum lift as illustrated in Fig. 2. Thus, the "throw" of the variable crank action of the pin 15 may be changed by altering its rotational position relative to the hub 11.

In order to compensate for the variable weight distribution occurring as the position of the pin 15 is altered, a plate constituting a balance weight 21 is journalled on a circular eccentric 22 formed integrally with pin 15 and the hub portion 16 thereof. The eccentric 22 is arranged to alter the position of the balance plate 21 to maintain balance as the pin moves from its centered position (Fig. 3) to its position of maximum throw (Fig. 2). The balance plate 21 is preferably of circular form and is provided with a slot 23 for the reception of a stud or cap screw 24 mounted in the hub 11. This structure serves to prevent rotation of the balance plate relative to the hub but permits independent movement thereof in the plane of the radius defining the maximum lift of the eccentric 22. It will be readily seen that as the shaft S is rotated the eccentric movement of the pintle 18 and circumambient walls of the hub 11 defining the recess 14 will effect an orbital movement of the pin 15 and that the plate 21, though carried thereby, is subject to an independent sliding movement relative thereto.

Figure 5:
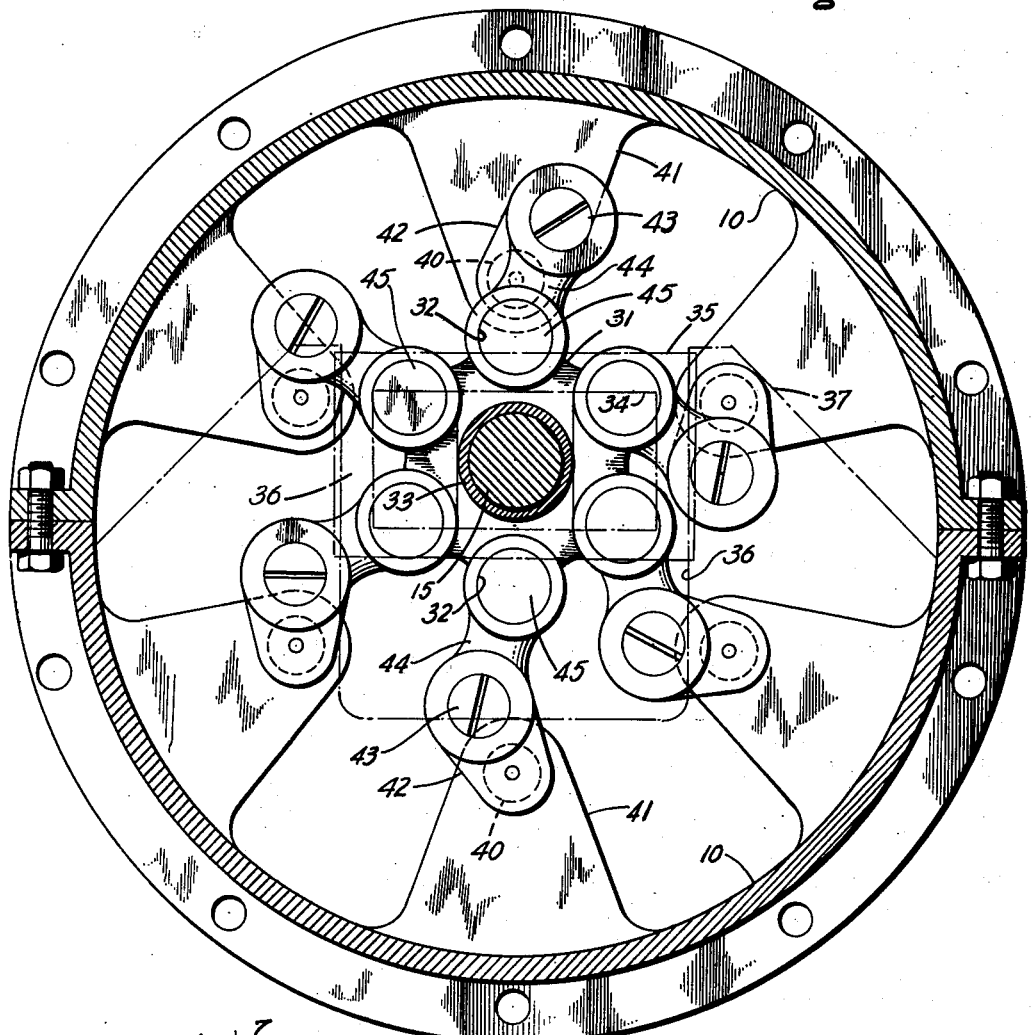
Fig. 5 is a transverse sectional view taken on line 5—5 of Fig. 1, the outline of the Scotch yoke being indicated in broken lines in order to show more clearly the relation of the adjacent parts.
Figure 6:
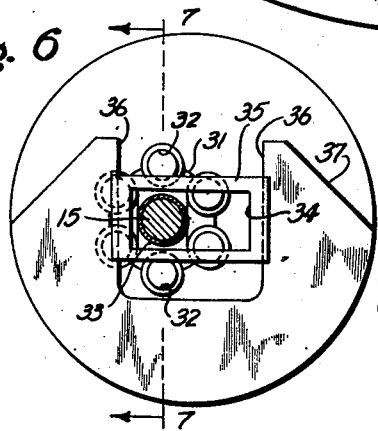
Fig. 6 is a view similar to Fig. 5 illustrating the relation of the driving pin, Scotch yoke, and spider.
Figure 7:
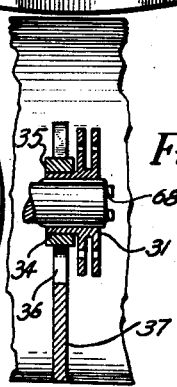
Fig. 7 is a longitudinal section taken on line 7—7 of Fig. 6.

As will be seen in Figs. 1 and 5, the pin 15 provided with a bushing 33 having a spider 31 journalled thereon which is supported for orbital movement with the pin by a Scotch yoke 35. The spider is formed with a plurality of openings 32 disposed in equi-spaced relation and provided for the reception of the pins for the clutch actuating linkage. As will be seen in Figs. 6 and 7 the hub of the spider is machined for sliding engagement within a rectangular opening 34 in the slide-frame 35 of the Scotch yoke. The outer vertical side walls of the frame 35 are grooved for engagement with guide rails 36 formed in a web 37 of the housing 10. With this structure the spider will be moved in the orbital path of the pin 15 while rotational movement thereof relative to the medial axis of the pin is restrained. Each opening 32 of the spider, therefore, is moved through an orbit identical to the orbit of pin 15, and any forces acting to rotate the spider relative to the axis thereof are balanced by the guiding effect of the Scotch yoke.

A plurality of crankshafts 40 disposed in equi-spaced relation are journalled in webs 41 formed in the housing 10. The inner ends of the shafts are formed with crank arms 42 having crankpins 43 thereon constituting journal bearings for connecting rods 44 fulcrumed on pins mounted in the openings 32 in the spider 31. Thus the orbital motion of the spider as biased by the pin 15 will effect an oscillatory movement of the shafts 40, the maximum throw of which will be recognized by comparisons of opposite crank arms 42 in Fig. 8.

In order to obviate the possible occurrence of a dead center relation of the crank arms 42 and connecting rods 44, the center to center length of said crank arms is greater than the maximum orbital radius of the spider 32. Hence the movement of the shafts 40 is limited to an oscillation of a magnitude consonant with the radius of the orbit of the pin 15.

Referring now to Figs. 1 and 8, the outer end portions of the shafts 40 are supported in brackets 45 disposed in spaced relation with each other about the inner circumference of the housing 10 and in progressive stepped relation with the medial axis thereof. The free ends of the shafts are machined for the keyed support of arms 46 having clutch connecting rods 47 pivotally mounted thereon and engaged in turn with apertured bosses 48 formed in the outer walls of sleeves 49 constituting casings for ratchets or overrunning clutch units A.

The clutch units A which are the subject of my previous Patent No. 2,240,359, operate on a shaft 51 which is formed with a diametrically enlarged section 52 (Fig. 1) of a suitable length to receive the clutch sleeves 49. The clutch section of shaft 51 is formed with longitudinal grooves defining radial side walls 54 and fluted base portions 56 arranged to accommodate the support and pivotal movement of the inner end of pawls 57. The side walls 54 of the grooves are drilled for the reception of springs 58 disposed in normal relation to the side walls of the pawls to maintain the outer eccentric faces of the pawls in intimate engagement with the inner faces of the clutch sleeves 49. Fig. 9 illustrates schematically the foregoing relation of parts embodied in two units of the clutch assembly including the clutch separator plates 59 which serve to prevent longitudinal displacement of the pawls 57.

From the foregoing it will readily be recognized that the oscillatory movement of the clutch sleeves 49 initiated by the shafts 40 and linkage therefor will effect an intermittent uni-directional rotation of the shaft 51, due to the ratchet action of the clutch pawls 57. The multiplicity of clutch units and the timed order of operation thereof as contemplated herein provides an overlapping application of power which effects a rotational movement of the shaft 51 which closely approximates uniform motion at all but very low speeds, such for example as those below 30 R. P. M.

The speed reduction ratio of the transmission is dependent upon the relation of the orbital radius of the pin 15, the lengths of the crank arms 42 and 46, and the radius of the arc described by the apertured bosses 48. The maximum speed of the output shaft may be made greater or less than the speed of the drive shafts by so designing the parts.

Referring again to Fig. 1, the shaft 51 is rotatably supported upon ball bearings 60 and 61 which are mounted in transverse walls in the housing 10 and restrained from longitudinal movement therein by shouldered bearing seats.

The end of the shaft adjacent the ball bearing 61 is machined for the support of a secondary clutch unit B similar in structure to the clutch units A but formed with the pawls 63 therein arranged and configured for driving engagement of a drum in the opposite direction to that of the clutch units A.

Figure 3:
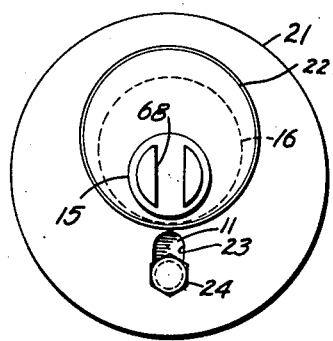
Fig. 3 is a view similar to Fig. 2 illustrating the centered position of the pin.

The overrunning clutch drum 64 is formed with a pilot bearing 65 journalled in a recess 66 in the inner end of the shaft 51 to provide a bearing surface of adequate length to maintain the drum and shaft in coaxial alignment. The drum 64 is formed with a tongue 67 diametrically disposed on the rearward face thereof (Fig. 11) and machined for sliding engagement with groove 68 in the end of the pin 15 (Fig. 3). As the pin 15 moves through the orbits of variable magnitude under the influence of the compound eccentric as heretofore disclosed, the drum 64 of the overrunning clutch will be rotated thereby, the cam faces of the pawls 63 sliding over the working face of the drum. When, however, the shaft 51 tends to rotate faster than the input shaft S, the pawls 63 will move into cramping engagement with the drum 64 causing the shafts 51 and S to rotate in unison. This structure prevents a "free wheeling" action between the driving and driven members of the assembly and eliminates the deleterious effects resulting therefrom.

The output shaft 70 is supported by an antifriction bearing 71 and a pilot bearing 72 formed at the end of shaft 51. The inner end of the shaft 70 is formed with an enlarged flange having internal and external gear teeth machined therein. The external gear teeth are entrained with a pinion 74 engaged with an idler pinion 75. A sliding clutch member 76, controlled by gear shift lever 77, is supported upon splines 78 formed in the outer end of the shaft 51, the clutch being constructed to engage either the internal teeth of spur gear 73 for direct drive, to idle in a neutral position (Fig. 1), or to engage the idler pinion 75 for reverse drive.

The modified embodiment of the structure illustrated in Fig. 10 comprises a power input shaft which is coupled with a pin assembly to provide a positive manual adjustment and control of the speed change ratio. This type of control is adapted for use in environs where the speed of the output shaft is a critical factor in the successful operation of the transmission. A machine tool is exemplary of one of such applications. As illustrated, the power input shaft 101 is formed with an enlarged hub 111 having an eccentric circular recess 114 in the face thereof to accommodate the support of the hub 116 of a pin 115 which is disposed in eccentric relation thereto. The pin 115 is further provided with an eccentric shoulder 122 for the support of a balance plate 121 having a radial slot 123 therein which engages a pin 124 rigidly secured to the face of the hub 111.

The operation of the pin, hub, and balance plate assembly is the same as heretofore described in that the rotation of the pin relative to the hub of the input shaft alters the center to center distance of said pin and the shaft, the balance plate compensating for changes in balance. In this embodiment the pin 115 is formed with a stem 131 concentric with the hub 116 and mounted to extend through an aperture in the bottom of the recess 114 of the input shaft hub 111. The periphery of the stem 131 is machined with two opposed helical grooves 132 which are engaged by a nut or follower 133. The body of the follower is provided with an aperture for the input shaft 101 which is disposed in parallel relation with the stem 131. Referring to Fig. 12, it will be seen that the body of the follower 133 is supported upon a roller bearing 134 mounted in a yoke 135 which is arranged in concentric relation with the input shaft 101. A feed screw 136 parallel the shaft 101 is engaged with a threaded boss 137 formed in the upper portion of the yoke to produce longitudinal motion of the yoke and follower which in turn develops a rotative movement of the stem 131 and the hub 116. Rotation of the feed screw 136 as shown is effected by manipulation of a handwheel 138 which is intergeared through a worm 139 and a worm wheel 140 keyed to the shank of the feed screw.

In operation the transmission embodying the foregoing preferred structure functions as an automatic speed change mechanism which, with varying load and power input conditions, provides a constant balance of power input and load. In other words, the speed of the output shaft is always at the maximum speed consonant with the torque imposed on the output shaft. This characteristic of operation provides optimum power transmission economy in the many applications utilizing variable power and variable speed sources of power such as an internal combustion engine where the cost of operation varies with the speed of the power unit.

Figure 4:
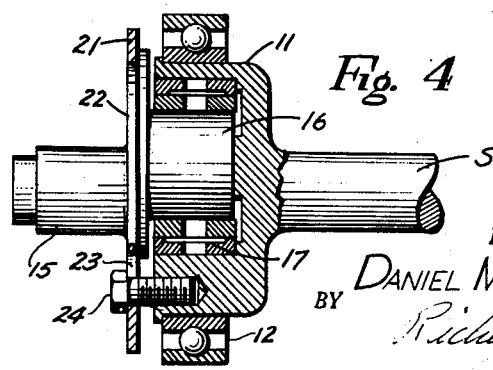
Fig. 4 is a longitudinal section through the structure shown in Fig. 3.

The balance of input and output power is effected by the force acting on the balance plate which tends to move it from its axis of rotation and the counterforce acting on the center of mass of the pin which tends to move it from its axis of rotation. Theoretically, there are no radial forces acting upon the circular balance plate and the pin when they are in their central positions as shown in Figs. 3 and 4. However, due to the rotational inertia of the parts during initial acceleration of the driving members, the pin and balance plate move easily and smoothly from the center of rotation thereof. When the torque imposed on the output shaft increases and the load thereon becomes greater than the input power, the input shaft will decelerate slightly and the pin and balance plate will approach each other causing a reduction in the output speed conforming with the increase in torque.

Heretofore, the mechanisms which have been produced for the positive transmission of power have been limited to speed ranges and torque loads which precluded many adaptations and types of operation. With the improved transmission the speed variation is infinite and the mechanism may be built to meet the torque demands of the power source with which it is associated.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A transmission comprising a housing, a drive shaft mounted for rotative movement therein, an enlarged head on said shaft within said housing, said head having an annular groove therein disposed in eccentric relation to the axis of the shaft, a pin, an eccentric hub thereon seated in said groove, means to vary the center to center distance between the axis of the pin and the axis of the shaft, a balance plate on said hub formed with a circular aperture, an eccentric on said hub opposed to the eccentricity of the pin with respect to the hub, the aperture in the balance plate being journalled on said eccentric, and means to prevent rotation of the balance plate with respect to the head.

2. A transmission comprising a housing, a power input shaft therein, an eccentric bearing on said input shaft, a journal therein, a pintle on said journal disposed in eccentric relation to the axis thereof, a bearing face on said journal disposed in eccentric relation to the axis thereof, a plate having an opening therein engaged with said bearing face, said opening being disposed in eccentric relation to the center of mass of said plate, the plate being mounted on said journal with the center of mass thereof disposed to counterbalance the center of mass of the portion of the journal containing said pin, said plate having a radial slot therein disposed remote the center of the opening in the plate, and a stud in the eccentric bearing in the input shaft engaged with said slot to delimit the movement thereof.

3. A transmission comprising a housing, a drive shaft, an eccentric bearing in the end thereof, a journal therein, a drive pin on the journal in eccentric relation therewith, the eccentricity of the bearing relative to the drive shaft being equal to the eccentricity of the pin relative to the journal, a circular cam on said drive pin in eccentric relation with the pin and with said journal, a balance plate mounted on said cam for opposing the motion of said pin, said plate having a radial slot therein remote from said journal, and a stud in the end of said drive shaft engaged with said slot.

4. A power transmission comprising a housing, an input shaft, a flange on the inner end of said shaft, an anti-friction bearing seated in said housing for the support of said shaft, a second anti-friction bearing seated in said housing for the support of said flange, an eccentric bearing in the inner face of said flange, a drive pin journalled in said bearing, a pintle on said pin in eccentric relation with said bearing, a circular cam on the drive pin in eccentric relation with said bearing and with said pintle, a fly weight journalled on the cam in weight opposition to the pintle, a slot therein, a pin secured to the face of said flange and engaged therewith, parallel guideways in said housing, a slide frame reciprocable therein, a spider journalled on said pintle, a hub on said spider machined for reciprocation within said slide frame, and means for converting orbital movement of the spider into rotational movement of a power take-off shaft.

5. In a power transmission, a housing, an input shaft, a flange on the inner end of said shaft, an anti-friction bearing seated in said housing for the support of said shaft, a second anti-friction bearing seated in said housing for the support of said flange, an eccentric bearing in the inner face of said flange, a drive pin journalled in said bearing, a pintle on said pin in eccentric relation with said bearing, a circular cam on the drive pin in eccentric relation with said bearing and with said pintle, a fly weight journalled on the cam in weight opposition to the pintle, a slot therein, and a pin secured to the face of said flange and engaged therewith.

6. In a power transmission, an input shaft, a flange on the inner end of said shaft, an eccentric bearing in the inner face of said flange, a drive pin journalled in said bearing, a pintle on said pin in eccentric relation with said bearing, a circular cam on the drive pin in eccentric relation with said bearing and with said pintle, a fly weight journalled on the cam in weight opposition to the pintle, a slot therein, and a pin secured to the face of said flange and engaged therewith.

DANIEL M. WEIGEL.

REFERENCES CITED

The following references are of record in the file of this patent:

UNITED STATES PATENTS

| Number | Name | Date |
| --- | --- | --- |
| 305,215 | Moore | Sept. 16, 1884 |
| 1,258,796 | Luebkert | Mar. 12, 1918 |
| 1,553,193 | Siddle | Sept. 8, 1925 |
| 1,557,432 | Defordt | Oct. 13, 1925 |
| 1,780,423 | Hallett | Nov. 4, 1930 |
| 1,995,333 | Svensson | Mar. 26, 1935 |
| 2,036,624 | Garratt | Apr. 7, 1936 |
| 2,036,625 | Garratt | Apr. 7, 1936 |
| 2,109,610 | Austin | Mar. 1, 1938 |
| 2,135,274 | Braden | Nov. 1, 1938 |
| 2,174,698 | Jacobs | Oct. 3, 1939 |
| 2,179,827 | Meller | Nov. 14, 1939 |
| 2,209,417 | Obermoser | July 30, 1940 |
| 2,257,854 | Peterson | Oct. 7, 1941 |

FOREIGN PATENTS

| Number | Country | Date |
| --- | --- | --- |
| 7,736 | France | Oct. 1, 1907 |
| (Addition to No. 370,183) | | |